United States Patent [19]

Richards

[11] Patent Number: 4,507,785

[45] Date of Patent: Mar. 26, 1985

[54] UNPOLARIZED ELECTRO-OPTICALLY Q-SWITCHED LASER

[75] Inventor: James Richards, Tea Tree Gully, Australia

[73] Assignee: The Commonwealth of Australia, Canberra, Australia

[21] Appl. No.: 445,380

[22] PCT Filed: Mar. 30, 1982

[86] PCT No.: PCT/AU82/00043

§ 371 Date: Nov. 26, 1982

§ 102(e) Date: Nov. 26, 1982

[87] PCT Pub. No.: WO82/03502

PCT Pub. Date: Oct. 14, 1982

[51] Int. Cl.³ .............................................. H01S 3/11
[52] U.S. Cl. ..................................... 372/12; 372/105; 372/100
[58] Field of Search ...................... 372/13, 12, 9, 105, 372/100

[56] References Cited

U.S. PATENT DOCUMENTS 3,243,724 3/1966 Vuylsteke .
3,564,450 2/1971 Immarco et al. .
3,740,663 6/1973 Andringa .

OTHER PUBLICATIONS

Richards; "Unipolarized EO Q-Switched Laser"; *Appl. Optics* vol. 22, No. 9; 1 May, 1983.
Bespalov et al; "Single Crystal, Electro-Optic Shutter for Q-Switching Lasers Emitting Unpolarized Radiation"; *Opt. Tech.* (38), No. 12, Dec. 1971.
Kamach et al; "Electro-optically Q-Switched Pulse-periodic YAG:Nd³+ Laser"; *Sov. Jour. Quant. Electron.* 8(7); Jul. 1978.

*Primary Examiner*—William L. Sikes
*Assistant Examiner*—Léon Scott, Jr.
*Attorney, Agent, or Firm*—Cushman, Darby & Cushman

[57] ABSTRACT

An unpolarized electro-optically Q-switched laser using a laser rod (4), a prism (1) and a Pockels cell (5) between a pair of mirrors (2, 3) wherein the prism (1) is selected to give a low-angle walk-off arranged that when a quarter wave length voltage is applied to the Pockels cell the first pass will be cancelled by an equal and opposite walk-off during the return path.

9 Claims, 5 Drawing Figures

UNPOLARIZED ELECTRO-OPTICALLY Q-SWITCHED LASER

This invention relates to an unpolarised electro-optically Q-switched laser.

The output from conventional Q-switched lasers decreases when induced birefringence is present in the laser rod. The explanation for this is that conventional lasers contain a polariser that rejects any radiation not correctly polarised, hence the depolarisation that occurs due to birefringence leads to lost energy and poor efficiency. The birefringence could have several sources, a common one is due to thermal stresses that occur in high repetition rate solid state lasers.

Techniques exist for maintaining efficiency when birefringence is present, but these have some deficiencies. For example the method of Scott and De Wit employs two separate laser rod/flashlamp asssemblies and is quite complex. The crossed-Porro laser is simpler but the output coupling available at high repetition rates is restricted to near 50% which may not be suitable for lasers generating very high or very low peak powers. Further, at high input power levels the crossed-Porro laser suffers from hot spots that may be difficult to overcome. One method of eliminating all the effects of birefringence is to generate an unpolarised beam. Electro-optic devices able to switch unpolarised radiation have been fabricated but these are not readily available. The object of the present invention is to provide an improved laser which is relatively free of the problems referred to and the present invention achieves this by a laser geometry able to generate unpolarised, Q-switched radiation using commonly available electro-optic Pockels cells and including a birefringent prism.

According to this invention an improved electro-optically Q-switched laser is provided wherein a laser cavity is formd between a totally reflective mirror and a partially reflective mirror and contains a laser rod and a Q-switching Pockels cell, characterised by a birefringent prism of a material selected to give a low-angle walk-off so arranged in the said cavity that, when a quarter-wave voltage is applied to the Pockels cell, the first pass will be cancelled by an equal and opposite walk-off during the return path.

The following description will refer to the drawings numbered respectively FIGS. 1 to 5 in which.

Figure 3:
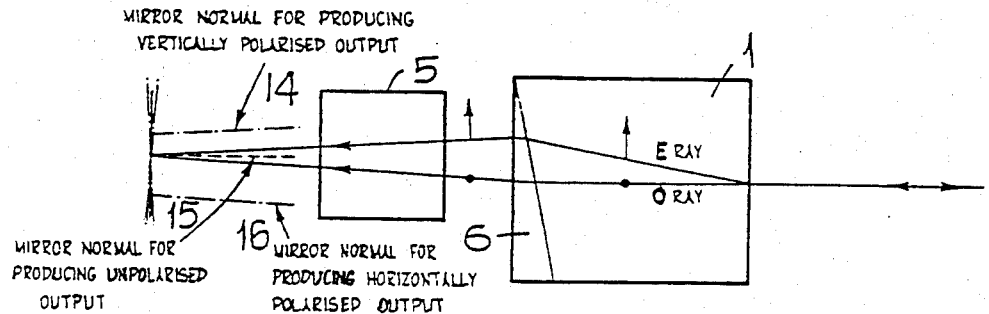

FIG. 3 demonstrates the method of producing a plane polarised output, and

Figure 4:
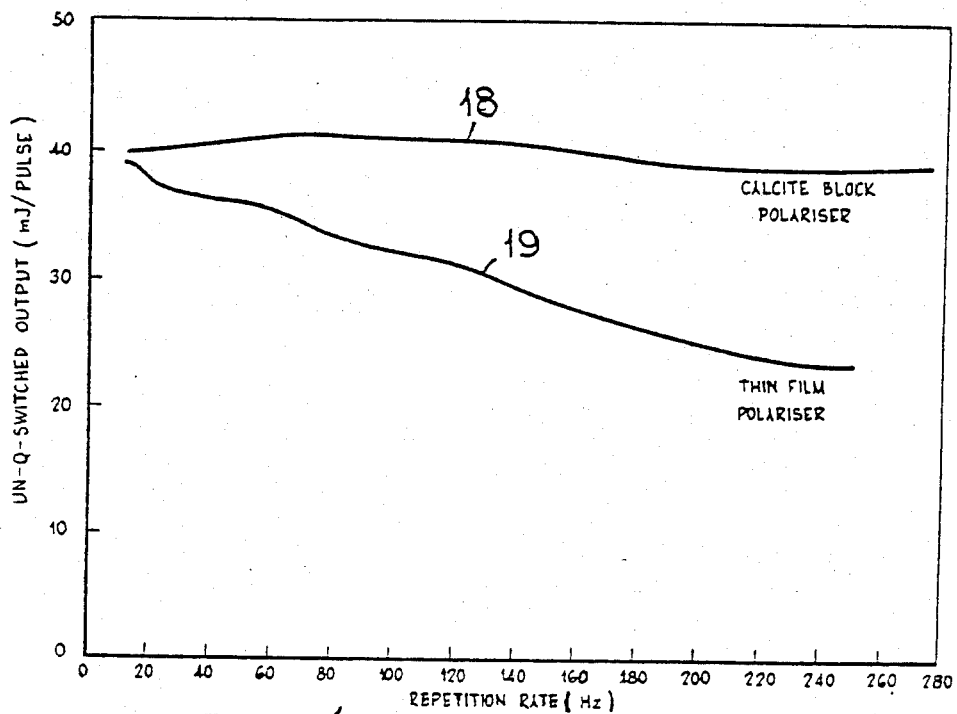
Figure 5:
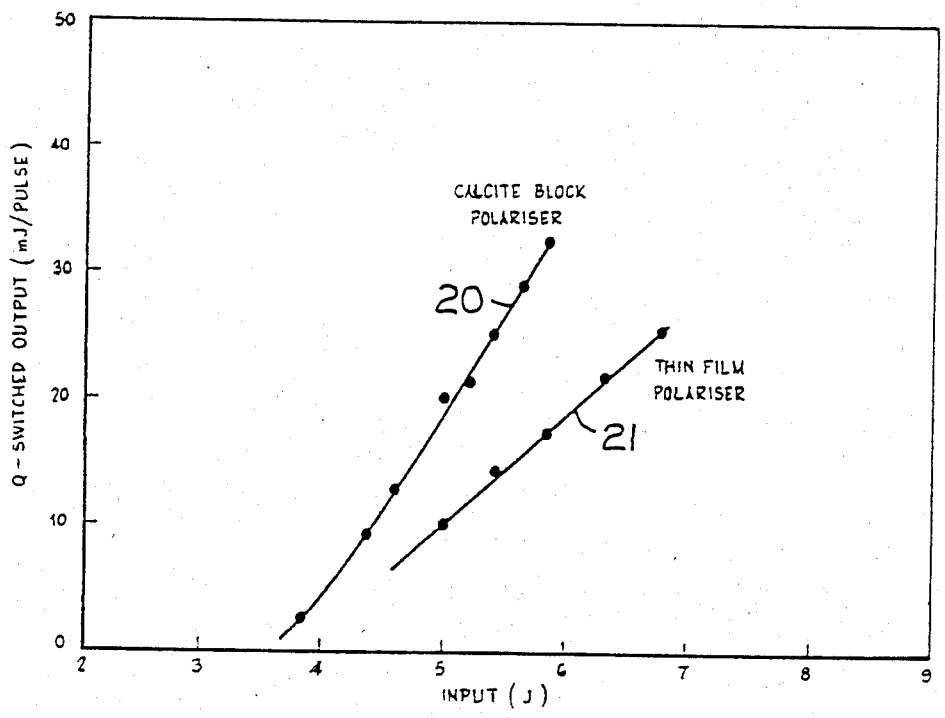

FIGS. 4 and 5 are graphs showing un-Q-switched output against repetition rate and Q-switched output against input at 168 Hz.

Figure 1:
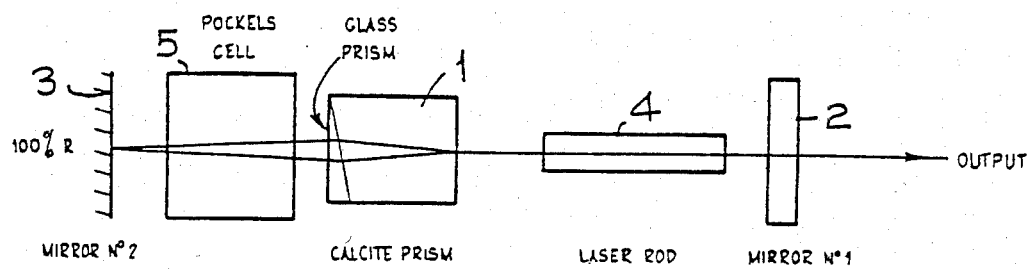
FIG. 1 shows the laser geometry.

The schematic diagram of the laser as shown in FIG. 1 shows that it operates on a somewhat different principle to that commonly used. The novel feature of this laser is that the normal polarising device is, as said, replaced by a birefringent prism 1 of special design. This prism must have the property of providing approximately 1 degree of angular walk-off between orthogonal polarisations after passing through the prism.

In FIG. 1 the semi-opaque mirror 2 forms one end of the laser cavity, the other end being defined by the total mirror 3. The laser rod 4 is pumped by any suitable source. The Pockels cell or Q-switch is designated 5.

Figure 2:
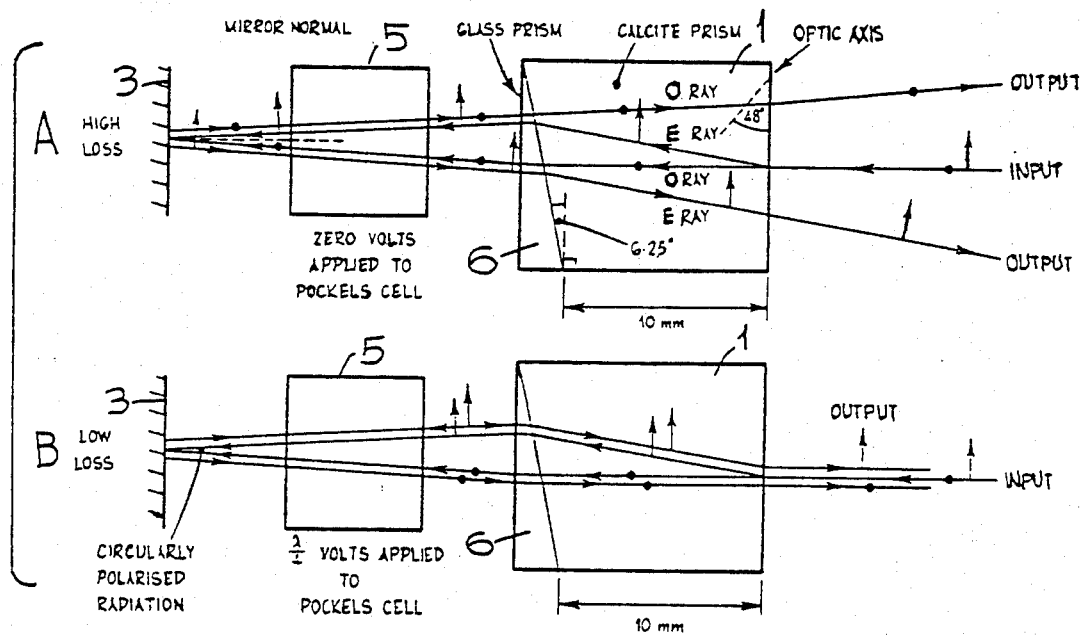
FIG. 2 shows the principle of operation, showing at A the condition of zero volts on the Pockels cell and at B the condition when the cell is energised.

The principle of operation of the laser is shown in FIG. 2. Radiation, after passing through the birefringent prism 5 is split up into two orthogonally polarised components, the extraordinary E and the ordinary O rays, that propagate in two slightly different directions. If these two rays are reflected by the mirror 3 back through the prism 1 a further separation of the two rays will occur. Provided this separation is of the order of 1 degree the losses in the cavity will be very high and laser action will be suppressed. However, if a voltage is suddenly applied to the Pockels cell 5 to induce a quarter wave difference between the E and O rays returning to the prism from the mirror 3 will be interchanged. When this happens the walk-off occurring in the first pass will be cancelled by an equal and opposite walk-off during the return pass, hence the beam returning to the laser rod 4 will be parallel to the rod axis and losses will be low, allowing a Q-switched pulse to develop.

The output, which is obtained by placing a partially transmitting mirror 2 at one end of the cavity is unpolarised because the switching action is independent of the polarisation state of radiation incident on the prism 1. Components used in the laser are quite standard with the exception of the birefringent prism which is made from calcite with the shape shown in FIGS. 2 and 3. It is designed to produce an angular walk-off of 1 degree and to produce a cross-over 60 mm from the prism. In the case illustrated the birefringent prism 1 comprises a calcite block of 10 mm long cut to prism shape with the optic axis inclined at 48° to the entry face. The exit face is inclined at an angle of 6.25° to the entry face, and the simple glass prism 6, may be used to remove the 3° displacement caused by the calcite prism so that in-line operation occurs.

The object of achieving a cross-over is that if the mirror 3 is placed at the cross-over the reflected rays follow the same path as the incident rays and, provided a quarter wave voltage is applied to the E.O. cell 5, the rays returned to the laser rod 4 will completely fill the rod. If the mirror 3 is not placed at the cross-over some restriction in the useful aperture of the rod will result with a corresponding reduction in efficiency. A crossover to prism spacing of 60 mm was chosen because it was felt most Pockels cells would fit in this space.

While this laser geometry does not permit PTM operation, the design does have some very useful advantages. One is that the birefringent prism, with good anti-reflection coatings, should have a lower insertion loss than the normal polarising prisms used in other lasers, e.g. typically ½% loss per pass compared to as much as 6% loss per pass. The other feature of the design is that it is possible to produce an output that is plane polarised. Further, the output polarisation can be selected between two orthogonal states. In this mode of operation, shown in FIG. 3, the alignment of mirror 3 is adjusted to reflect back along the rod axis either the E or O ray. In this case Q-switching is achieved by rapidly removing the quarter wave voltage applied to the Pockels cell 5. If the laser is operated in this manner it duplicates the characteristics of conventional lasers with, of course, the added benefit of more efficient operation due to lower insertion losses.

The arrows 14, 15 and 16 show respectively the effect of mirror positioning, 14 showing the mirror normal for producing vertically polarised output, 15 showing the mirror normal for unpolarised output, and 16 showing the mirror normal for producing horizontally polarised output.

Results obtained with the laser are shown in FIGS. 4 and 5. Also shown are results obtained using a Mac-Neille type of thin film polariser which was known to have an insertion loss of less than 1.4% per pass. The laser resonator consisted of a short (20 cms) Fabry-Perot type with a 100% reflecting mirror at one end and an etalon reflector at the output end of the resonator. A Lasermetrics Pockels cell was used for Q-switching and the 3 mm diameter Nd:YAG rod was placed in an elliptical, close-coupled, pump cavity.

The dependence of un-Q-switched output on repetition rate is shown in FIG. 4 where repetition rate is plotted against un-Q-switched output. The result clearly reveals that the output 18 from the laser employing the special polariser shows no significant fall-off whereas the output 19 from the laser using a thin film polariser shows a 40% fall-off at 250 Hz. Besides this expected improvement, there is also an improvement of about 6% in the output at low repetition rates. This is not related to losses due to thermally induced birefringence in the laser rod but reflects the lower insertion loss of the special polariser. The un-Q-switched output was chosen for comparing the performance of the polarisers because it eliminated the need to re-tune the lasers at each repetition rate, as was necessary when Q-switching. This allowed more reliable data on the relative losses in the resonators to be obtained.

The dependence of Q-switched output on input to the flashlamp at 168 Hz is shown in FIG. 5, the line 20 showing the output when using the calcite block polariser, and the line 21 showing the output from a thin film polariser. The lasers were tuned for maximum peak power (rather than maximum energy) and the improvement in laser efficiency at these high repetition rates was found to be near 50%. In this case input was plotted against switched output.

From the above it will be realised that an unpolarised Q-switched laser has been developed and shown to be more efficient that a conventional Fabry-Perot laser. The improvement in efficiency is as high as 50% at high repetition rates and approximately 5% at low rates. Another advantage of the design is that the laser allows a choice of plane polarised or unpolarised outputs. These features make the design unique and suitable for many applications.

The claims defining the invention are as follows:

1. The method of producing a laser beam from a laser rod confined between a partially transmitting mirror and a totally reflecting mirror defining a resonant laser cavity and containing a Pockels cell in laser cavity comprising the steps of: passing the radiation from said laser rod through a birefringent prism element also positioned in the laser cavity said prism element splitting the radiation into orthogonally polarized extraordinary E rays and ordinary O rays which propagate in slightly different directions, resulting in walk-off; and reflecting back the rays along the cavity by said totally reflecting mirror while applying a voltage to the Pockels cell to induce a quarter wave difference between the E rays and O rays to interchange the E rays and the O rays, whereby the walk-off occurring in a first pass through said prism element is cancelled by an equal and opposite walk-off during the return path through prism element so that the beam returning to the laser rod is parallel to the rod axis.

2. The method of claim 1 wherein the said totally, reflecting mirror is disposed at an angle to reflect back along the rod axis either the E rays or the O rays, and said method further comprises the step of Q-switching by rapidly removing said voltage applied to said Pockels cell.

3. The method of claim 1 or 2 wherein error induced by the birefringent prism element is corrected by passing the rays through a glass prism at that end of the said prism element adjacent to the said totally reflecting mirror.

4. The method of claim 1 wherein the said divergent E and O rays are produced by the said birefringent prism element by passing the rays from the said laser through a calcite prism having its optical axis inclined to the said laser rod at an angle and having its exit face also inclined at an angle to the axis of the said cavity to cause the angular walk-off.

5. The method of claim 4 wherein the rays leaving the said exit face of the said calcite prism are passed through a glass prism of similar angle to the angle of the calcite prism exit face.

6. An unpolarised electro-optically Q-switched laser wherein a resonant laser cavity is formed between a totally reflective mirror and a partially reflective mirror and contains a laser rod and a Q-switching Pockels cell, a a birefringent prism of a material which gives a low-angle walk-off said prism being disposed in said cavity so that, when a voltage is applied to walk-off caused by a Pockels cell to induce a quarter wave difference between perpendicularly polarized rays, the first pass through said prism will be cancelled by an equal and opposite walk-off during a return path through said prism.

7. An unpolarised electro-optically Q-switched laser according to claim 6 wherein the said birefringent prism is a calcite prism having its optical axis inclined to the axis of the said laser rod and having its exit face inclined at an angle not exceeding 10° to a plane normal to the longitudinal axis of the cavity, and including a correcting prism.

8. An unpolarised electro-optically Q-switched laser according to claim 6 wherein the said prism is a substantially rectangular compound prism formed chiefly of calcite having its optical axis inclined to the axis of the said laser rod and having its exit face inclined at an angle not exceeding 10° to a plane normal to the longitudinal axis of the cavity, and a glass correcting prism adjacent the said inclined exit face to complete a substantially rectangular configuration.

9. An unpolarised electro-optically Q-switched laser according to claim 8 wherein the totally reflective mirror is disposed adjacent the said inclined face of the said prism which includes a glass correcting prism at the said face but with the Pockels cell disposed between the said glass prism and the said mirror, said laser further comprising mean for fixing the angle of said totally reflective mirror to reflect either ordinary rays or extraordinary rays generated by the said prism back through the said Pockels cell and axially into the said laser rod.

* * * * *